United States Patent
Bench et al.

(10) Patent No.: US 11,054,906 B2
(45) Date of Patent: *Jul. 6, 2021

(54) HAPTIC FEEDBACK IN NETWORKED COMPONENTS

(71) Applicant: International Business Machines Corporation, Armonk, NY (US)

(72) Inventors: Calvin C. Bench, Austin, TX (US); Gabriella Campagna, Austin, TX (US); Danchen Sun, Redwood City, CA (US); Michael L. Kenney, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,486

(22) Filed: Jan. 6, 2020

(65) Prior Publication Data

US 2020/0142493 A1 May 7, 2020

Related U.S. Application Data

(63) Continuation of application No. 16/033,290, filed on Jul. 12, 2018, now Pat. No. 10,599,222.

(51) Int. Cl.
*G06F 3/01* (2006.01)
*H04W 4/80* (2018.01)
*G06F 3/023* (2006.01)
*H04L 29/06* (2006.01)

(52) U.S. Cl.
CPC ............ *G06F 3/016* (2013.01); *G06F 3/023* (2013.01); *H04L 63/083* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,159,461 B2 | 4/2012 | Martin et al. | |
| 8,736,558 B2 | 5/2014 | East et al. | |
| 8,773,356 B2 | 7/2014 | Martin et al. | |
| 9,927,895 B2 | 3/2018 | Ligtenberg et al. | |
| 2005/0237306 A1 | 10/2005 | Klein et al. | |
| 2006/0168455 A1 | 7/2006 | Kelley et al. | |
| 2007/0133770 A1 | 6/2007 | LaPierre et al. | |
| 2007/0139226 A1* | 6/2007 | Morris | G06F 3/016 341/27 |
| 2010/0332224 A1* | 12/2010 | Makela | G09B 21/007 704/231 |

(Continued)

OTHER PUBLICATIONS

Andrea Bianchi, Ian Oakley, Dong Soo Kwon, "The secure haptic keypad; a tactile password system", Apr. 2010, https://dl.acm.org/doi/10.1145/1753326.1753488. (Year: 2010).*

(Continued)

*Primary Examiner* — Tuan S Nguyen
(74) *Attorney, Agent, or Firm* — Stosch Sabo (57) ABSTRACT

Haptic feedback can be provided by receiving an input character from a first user device, converting the input character to a haptic instruction comprising a plurality of tactile pulses, and outputting the haptic instruction on a second user device to cause the haptic motor of the second user device to vibrate according to the plurality of tactile pulses.

18 Claims, 5 Drawing Sheets

(56) References Cited

U.S. PATENT DOCUMENTS

| | | | |
|---|---|---|---|
| 2012/0218090 A1 | 8/2012 | Rothschild | |
| 2014/0101545 A1* | 4/2014 | Paek | G06F 3/0488 715/702 |
| 2015/0096001 A1* | 4/2015 | Morikuni | H04W 12/0608 726/7 |
| 2015/0142033 A1* | 5/2015 | Stulen | A61B 17/320068 606/169 |
| 2015/0293592 A1* | 10/2015 | Cheong | G06F 3/0416 345/173 |
| 2015/0378514 A1* | 12/2015 | Keski-Jaskari | G01L 1/16 345/178 |
| 2017/0047059 A1* | 2/2017 | Yang | A61B 5/123 |
| 2020/0015876 A1* | 1/2020 | Chou | A61B 5/068 |

OTHER PUBLICATIONS

Anonymous, "Computer on a Phone with Trackpad Docking Form Factor for Thin Laptop", An IP.com Prior Art Database Technical Disclosure, IP.com No. IPCOM000226458D, IP.com Electronic Publication Date: Apr. 4, 2013, 2 pages.

Anonymous, "Contextual keyboard", An IP.com Prior Art Database Technical Disclosure, IP.com No. IPCOM000243101D, IP.com Electronic Publication Date: Sep. 15, 2015, 6 pages.

Anonymous, "Haptic/Physical Input Supplement for Touch-Based Devices", An IP.com Prior Art Database Technica Disclosure, IP.com No. IPCOM000246015D, IP.com Electronic Publication Date: Apr. 26, 2016, 3 pages.

McAdam et al., "Distal Tactile Feedback for Text Entry on Tabletop Computers", © The Author 2009, Published by the British Computer Society, 8 pages, HCI 2009—People and Computers XXIII—Celebrating people and technology.

Unknown, "Morse Code Translator", © Copyright Stephen C. Phillips, 2015-2017, printed Jun. 1, 2018, 3 pages https://morsecode.scphillips.com/translator.html.

Roy et al., "Ripple: Communicating through Physical Vibration", 14 pages, University of Illinois at Urbana-Champaign, May 2015.

Norberg et al., "Web accessibility by Morse Code modulated haptics for deaf-blind", Proc. 10th Intl Conf. Disability, Virtual Reality & Associated Technologies, Gothenburg, Sweden, Sep. 2-4, 2014, Copyright 2014 ICDVRAT; ISBN 978-0-7049-1546-6, 8 pages.

Unknown, "Morse Code: MIDI & Text Generator", 2 pages, Last modification on Apr. 27, 2015, Copyright 2010, Robert Ecker. http://www.robertecker.com/hp/research/morse-generator.php?lang=en.

Unknown, "Morse Code SMS Vibrator apk", printed Jun. 14, 2018, 8 pages https://www.apkmonk.com/app/com.paulkline.textmessagemorsevibrator/.

Bench et al., "Haptic Feedback in Networked Components", U.S. Appl. No. 16/033,290, filed Jul. 12, 2018.

IBM, List of IBM Patents or Patent Applications Treated as Related, Jan. 6, 2020, 2 pages.

\* cited by examiner

HAPTIC FEEDBACK IN NETWORKED COMPONENTS

BACKGROUND

The present disclosure relates to haptic feedback, and, more specifically, to haptic feedback in networked components.

SUMMARY

Aspects of the present disclosure are directed toward a computer-implemented method comprising receiving an input from a first user device. The input can comprise a character. The method can further comprise converting the character to a haptic instruction comprising a plurality of tactile pulses. The plurality of tactile pulses can comprise at least a first pulse of the plurality of tactile pulses lasting a first time. The plurality of tactile pulses can further comprise at least a second pulse of the plurality of tactile pulses lasting a second time. The method can further comprise outputting the haptic instruction on a second user device to cause the second user device to vibrate according to the plurality of tactile pulses. The second user device can be communicatively coupled to the first user device.

Aspects of the present disclosure are directed toward a computer program product comprising a computer readable storage medium, where the computer readable storage medium stores instructions executable by a processor to cause the processor to perform a method comprising receiving an input from a first user device. The input can comprise a character. The method can further comprise converting the character to an instruction. The instruction can comprise a plurality of pulses. The method can further comprise outputting the instruction on a second user device according to the plurality of pulses. The second user device can be communicatively coupled to the first user device.

Aspects of the present disclosure are directed toward a system comprising a processor and a computer-readable storage medium storing program instructions which, when executed by the processor, are configured to cause the processor to perform a method comprising receiving, from a physical keyboard communicatively coupled to a monitor displaying a password field of a website, an input to the physical keyboard. The input can comprise a character. The character can correspond to a character code. The method can further comprise matching the character code to a haptic instruction stored in a haptic database. The haptic instruction can comprise a plurality of tactile pulses. The plurality of tactile pulses can comprise at least a first pulse of the plurality of tactile pulses lasting a first time. The plurality of tactile pulses can further comprise at least a second pulse of the plurality of tactile pulses lasting a second time. The second time can be approximately three times the first time. The method can further comprise actuating a haptic motor in a mobile phone to cause the mobile phone to vibrate according to the haptic instruction. The mobile phone can be communicatively coupled to the physical keyboard via a personal area network (PAN). The method can further comprise producing a first acoustic signal from a speaker. Actuating the haptic motor can produce a second acoustic signal. The second acoustic signal can be canceled by the first acoustic signal.

The above summary is not intended to illustrate each embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward haptic feedback, and, more specifically, to haptic feedback in networked components. While the present disclosure is not necessarily limited to such applications, various aspects of the present disclosure can be appreciated through a discussion of various examples using this context.

Individuals suffering from the symptoms of old age or diseases such as multiple sclerosis can experience vision loss, hearing loss, and a loss of fine motor skills. These conditions make it difficult for these individuals to use electronic devices. Vision impairments make it difficult for these users to see letters typed on a screen. Additionally, the loss of fine motor skills makes it difficult to use a keyboard and can result in mis-strokes and typographical errors. This results in a need for the user to be able to review what has been typed and make corrections as necessary.

For security reasons, characters inputted into password fields are replaced by masking characters such as, for example, asterisks (e.g., "*") and bullet points (e.g., "●"). Entering a correct password can be difficult for individuals suffering from deteriorating vision and/or a loss of fine motor skills since there is no opportunity for such individuals to review what has been typed in order to correct any mis-strokes.

One solution involves using audio feedback through the use of a screen reader. This allows the user to receive feedback for what they have typed into a password field.

However, the security of the user's personal information is compromised as the password can easily be heard by nearby eavesdroppers Embodiments of the present disclosure include a computer communicatively coupled to a mobile phone. The computer can receive input through a keyboard. The input can comprise a character (e.g., a letter, a number, a symbol, etc.). The character can have a corresponding character code. The character code can be converted into a corresponding haptic instruction. The corresponding haptic instruction can comprise a plurality of tactile pulses. The plurality of tactile pulses can comprise at least a first pulse lasting a first time and at least a second pulse lasting a second time. The corresponding haptic instruction can be outputted to the mobile phone and cause the mobile phone to activate a haptic motor. The haptic motor can cause the mobile phone to vibrate according to the corresponding haptic instruction. The haptic pattern can be interpreted by a user in order to provide feedback for what is typed.

Aspects of the present disclosure provide numerous advantages. First, aspects of the present disclosure improve usability by allowing the user to receive feedback without requiring the user to visually inspect characters on a screen. Second, aspects of the present disclosure improve information security since the feedback is felt and is not auditory. Thus, users can input personal information (e.g., passwords, social security numbers, etc.) with less risk of the information being intercepted by eavesdroppers. Third, aspects of the present disclosure accelerate feedback. For example, instead of converting large blocks of information (e.g., a paragraph of text) at once, aspects of the present disclosure can convert smaller portions of information (e.g., one character) concurrently while the information is being received (e.g., input, typed, etc.). Thus, aspects of the present disclosure allow a user to receive feedback approximately contemporaneously with inputting respective characters.

The aforementioned advantages are example advantages and not all advantages are listed. Furthermore, embodiments of the present disclosure exist that can contain all, some, or none of the aforementioned advantages while remaining within the spirit and scope of the present disclosure.

Figure 1:
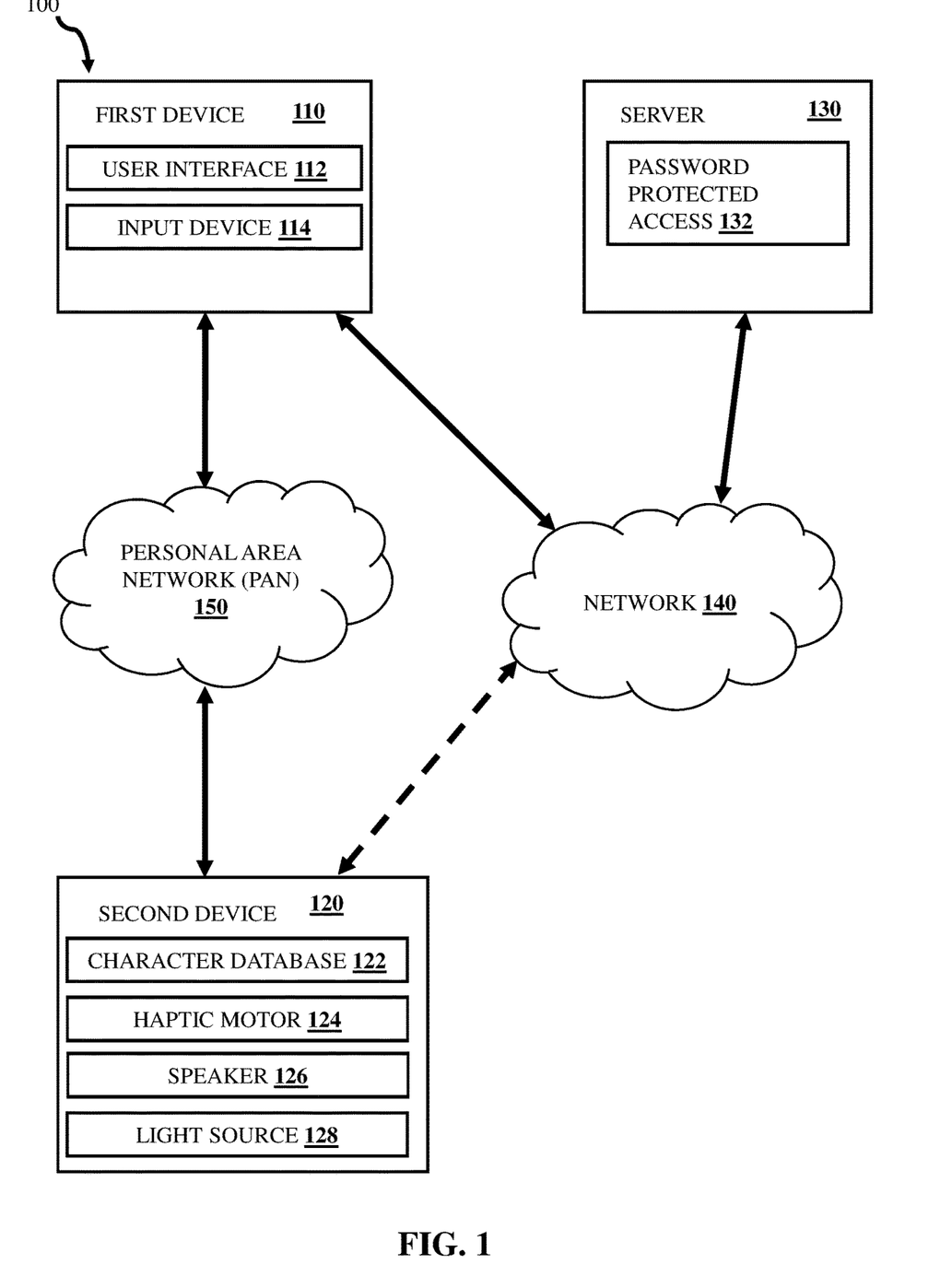
FIG. 1 illustrates a block diagram of an example networked components system in accordance with some embodiments of the present disclosure.

Referring now to FIG. 1, illustrated is a block diagram of an example networked components system 100 in accordance with some embodiments of the present disclosure. Networked components system 100 can comprise a first device 110 communicatively coupled to a second device 120 and a server 130. In some embodiments, the first device 110 can be communicatively coupled to the server 130 by a network 140 such as, for example, the internet. The server 130 can include password protected access 132. The first device 110 can have a user interface 112 and an input device 114. Input can be received by the first device 110 through the input device 114. The input received by the first device 110 can comprise a character. The character received by the first device 110 can be transferred from the first device 110 to the second device 120 (e.g., over a personal area network (PAN) 150). The character can be converted to a haptic instruction. The haptic instruction can comprise a plurality of tactile pulses. The plurality of tactile pulses can comprise a first tactile pulse lasting a first time (e.g., 0.1 seconds, 0.25 seconds, 0.5 seconds, etc.) and a second tactile pulse lasting a second time (e.g., 0.3 seconds, 0.75 seconds, 1.5 seconds, etc.). In some embodiments, the second time can last approximately three times the duration of the first time. The second device 120 can vibrate according to the plurality of tactile pulses.

For the purposes of the present disclosure, the second time lasting approximately three times the duration of the first time is understood to be an approximation associated with absolute or relative tolerances. For example, given the first time, a second time within plus or minus 0.1 seconds, 0.25 seconds, or a different amount of time of three times the first time can be considered to be three times the first time. As another example, given the first time, a second time within plus or minus 1%, 5%, 10%, or a different percentage of three times the first time can be considered to be three times the first time.

The server 130 can be, but is not limited to, a website which can have password protected access 132. The user interface 112 can present a password field controlling access to password protected access 132. The password field can comprise a portion of the website hosted on server 130.

The first device 110 can be, but is not limited to, a desktop computer, a laptop, and/or a portable electronic device. In some embodiments, the input device 114 can comprise a physical keyboard. In various embodiments, the user interface 112 can be communicatively coupled to first device 110, or the user interface 112 can be physically integrated within the first device 110.

The second device 120 can be, but is not limited to, a mobile phone. The second device 120 can comprise a haptic motor 124. The haptic motor can be, but is not limited to, an eccentric rotating mass actuator (ERM), a linear resonant actuator (LRA), and/or a piezoelectric actuator.

In some embodiments, the second device 120 can comprise a character database 122. In some embodiments, the character received by the input device 114 can have a corresponding character code. The character code can be, but is not limited to, an American Standard Code for Information Interchange (ASCII) character code, a Unicode character code, and/or an International Organization for Standardization (ISO) character code. Converting the character to haptic feedback can comprise matching the character code to a pattern of pulses stored in the character database 122 and outputting the pattern of pulses as a haptic instruction to the haptic motor 124.

In some embodiments of the present disclosure, the first device 110 is communicatively coupled to the second device 120 by a personal area network (PAN) (e.g., PAN 150). Alternatively, in some embodiments, the first device 110 can be communicatively coupled to the second device 120 by a wireless local area network (WLAN), local area network (LAN), the internet, and/or a hard-wired connection.

In some embodiments of the present disclosure, the second device 120 can comprise a speaker 126 configured to reduce, conceal, cancel, mitigate, or otherwise limit a first acoustic signal generated by the second device 120 as the haptic motor 124 operates. The first acoustic signal can comprise a first amplitude and a first phase. The speaker 126 can produce a second acoustic signal comprising a second amplitude and a second phase. The second amplitude can be equal to the first amplitude, and the second phase can be inverse to the first phase such that the second acoustic signal cancels the first acoustic signal. In embodiments, utilizing speaker 126 to cancel the first acoustic signal generated by the haptic motor 124, information on amplitudes, phases, sequences, durations, and/or other relevant information can be stored in character database 122.

For the purposes of the present disclosure, the first amplitude equal to the second amplitude is understood to mean approximately equal to such that the first amplitude is similar to the second amplitude within a tolerance (e.g., within 1%, 5%, 10%, etc.). Likewise, the first phase inverse to the second phase is understood to mean approximately inverse such that the first phase is inverse to the second phase within a tolerance (e.g., within 1%, 5%, 10%, etc.).

In embodiments utilizing speaker 126 to reduce ancillary noise generated by the haptic motor 124, the character received by the first device 110 can be converted to an instruction comprising a plurality of acoustic pulses and a plurality of tactile pulses. The plurality of acoustic pulses comprising a first acoustic pulse lasting a first time and a second acoustic pulse lasting a second time. The plurality of tactile pulses comprising a first tactile pulse lasting a first time and a second tactile pulse lasting a second time. The plurality of acoustic pulses can then be outputted by the speaker 126 concurrently with the plurality of tactile pulses being outputted by haptic motor 124. The first acoustic pulse can mitigate ancillary noise generated by the haptic motor 124 outputting the first tactile pulse and the second acoustic pulse can mitigate ancillary noise generated by the haptic motor 124 outputting the second tactile pulse. Thus, embodiments utilizing speaker 126 can further improve device security by cancelling any ancillary sounds generated by haptic motor 124 while providing haptic feedback.

In some embodiments of the present disclosure, the speaker 126 can provide aural feedback in lieu of, or in combination with, haptic feedback from the haptic motor. The character received by the first device 110 can be converted to an aural instruction comprising a plurality of acoustic pulses. The plurality of acoustic pulses comprising a first acoustic pulse lasting a first time and a second acoustic pulse lasting a second time. The plurality of acoustic pulses can then be outputted by the speaker 126.

In some embodiments of the present disclosure, the second device can comprise a light source 128. The light source 128 can be, but is not limited to, a light emitting diode (LED), liquid crystal displays (LCD), and LED displays. The character received by the first device 110 can be converted to an instruction comprising a plurality of light pulses. The plurality of light pulses comprising a first light pulse lasting a first time and a second light pulse lasting a second time. The plurality of light pulses can then be outputted by the light source 128.

In some embodiments of the present disclosure, the character received by the first device 110 can be converted into an instruction comprising a plurality of pulses. The plurality of pulses can comprise at least a first pulse and at least a second pulse. The first pulse can comprise a first frequency and the second pulse can comprise a second frequency.

FIG. 1 is intended to represent the major components of an example networked components system 100, according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1.

Figure 2:
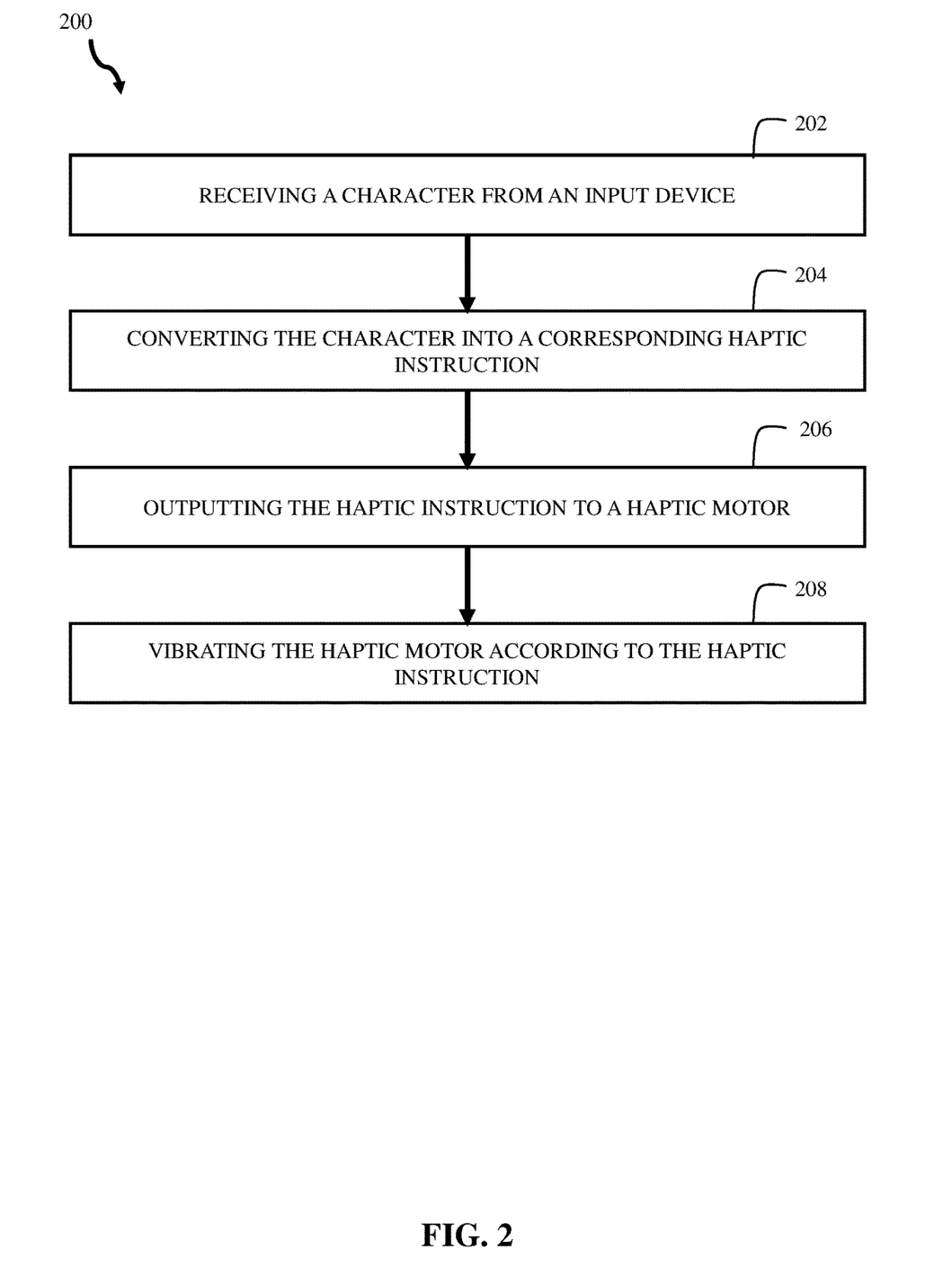
FIG. 2 illustrates a flowchart of an example method for providing haptic feedback to a user device in a networked components system, in accordance with some embodiments of the present disclosure.

Referring now to FIG. 2, illustrated is a flowchart of an example method for providing haptic feedback to a user device in a networked components system, in accordance with some embodiments of the present disclosure. The method 200 can be performed by one or more components of a networked components system (e.g., networked components system 100 of FIG. 1). Networked connections connecting the one or more components can include, but are not limited to, PAN, WLAN, LAN, the internet, or by a hard-wired connection. In some embodiments, the method 200 can be performed by a user device (e.g., second device 120 of FIG. 1) or an auxiliary communication system (e.g., auxiliary communication system 500 of FIG. 5). In other embodiments, the method 200 can be performed by alternative configurations of hardware and/or software. For clarity, the method 200 will be described as being performed by a user device.

In operation 202, a user device (e.g. second device 120 of FIG. 1) can receive a character from an input device (e.g. input device 114 of FIG. 1) of a first electronic device (e.g., first device 110 of FIG. 1). The first electronic device can be, but is not limited to, a desktop computer or laptop. The input device can be, but is not limited to, a physical keyboard. The user device can be, but is not limited to, a mobile phone. In some embodiments, the character input to the first electronic device populates a password field on a portion of a website. In some embodiments, the first electronic device receives an input comprising a plurality of characters. In some embodiments, the user device, the first electronic device, and/or the input device can be communicatively coupled by a PAN.

In operation 204, the character can be converted into a corresponding haptic instruction. The character can be associated with a character code. Character encoding systems include, but are not limited to, American Standard Code for Information Interchange (ASCII), Unicode, and International Organization for Standardization (ISO) coded character sets. The associated character code can be matched to a corresponding haptic instruction (e.g., using character database 122 of FIG. 1 to retrieve the corresponding haptic instruction for the associated character code). The haptic instruction can comprise a plurality of tactile pulses. The plurality of tactile pulses can comprise at least a first pulse lasting a first time and at least a second pulse lasting a second time. In some embodiments, the character can be converted into a corresponding haptic instruction contemporaneously with the character being received (e.g., a character converted to a haptic instruction within 0.1 seconds, 0.25 seconds, 0.5 seconds, 1.0 seconds, or a different amount of time after being received).

In operation 206, the haptic instruction can be outputted to a haptic motor (e.g., haptic motor 124 of FIG. 1) of the user device (e.g. second device 120). In some embodiments, the haptic instruction can be outputted to the haptic motor contemporaneously with the character being received (e.g., the haptic instruction outputted to the haptic motor within 0.1 seconds, 0.25 seconds, 0.5 seconds, 1.0 seconds, or a different amount of time after receiving the character).

In operation 208, the haptic motor can be activated to vibrate according to the haptic instruction. In some embodiments, the haptic motor can be, but is not limited to, an eccentric rotating mass actuator (ERM), a linear resonant actuator (LRA), and/or a piezoelectric actuator. In some embodiments, the haptic motor can be activated contemporaneously with the character being received (e.g., the haptic motor activated within 0.1 seconds, 0.25 seconds, 0.5 seconds, 1.0 seconds, or a different amount of time after receiving the character).

FIG. 2 is intended to represent the major operations of an example method for providing haptic feedback to a user device in a networked components system, according to embodiments of the present disclosure. In some embodiments, however, individual operations can have greater or lesser complexity than shown in FIG. 2, and operations other than, or in addition to, those shown in FIG. 2 can be present. Furthermore, in some embodiments, various operations illustrated in FIG. 2 can have greater, lesser, or different functionality than shown in FIG. 2.

Figure 3:
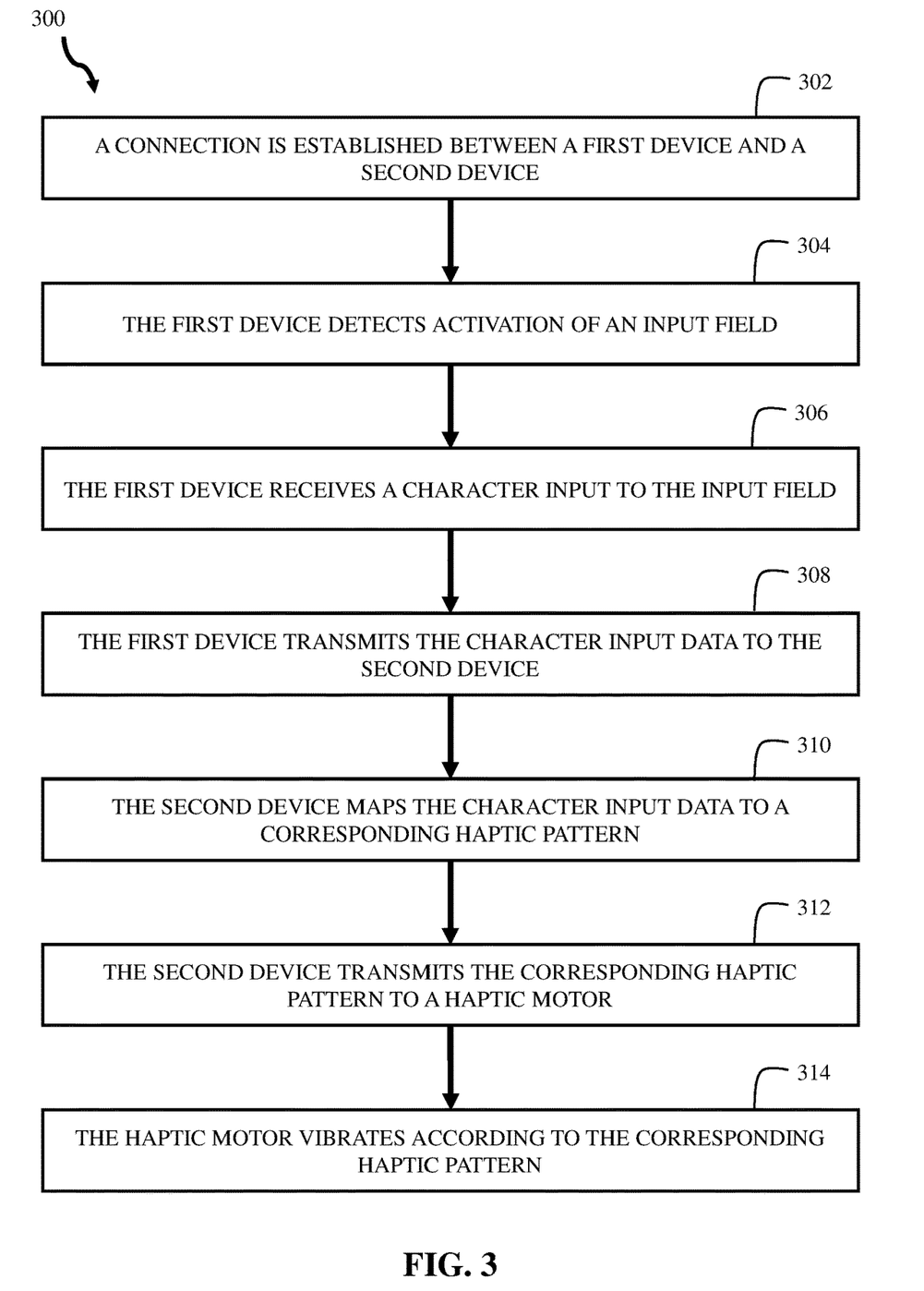
FIG. 3 illustrates a flowchart of an example method for providing haptic feedback using multiple devices in a networked components system, in accordance with some embodiments of the present disclosure.

Referring now to FIG. 3, illustrated is a flowchart of an example method 300 for providing haptic feedback using multiple devices in a networked components system, in accordance with some embodiments of the present disclosure. The method 300 can be performed by one or more components in a networked components system (e.g. networked components system 100 of FIG. 1) or an auxiliary communication system (e.g., auxiliary communication system 500 of FIG. 5). In other embodiments, the method 300 can be performed by alternative configurations of hardware and/or software.

In operation 302, a connection can be established between a first device (e.g. first device 110 of FIG. 1) and a second device (e.g. second device 120 of FIG. 1). The connection can be but is not limited to a PAN, WLAN, LAN, the internet, or a hard-wired connection.

In operation 304, the first device can detect activation of an input field. In some embodiments, the input field can be a password field on a portion of a website.

In operation 306, the first device can receive a character input to the input field (e.g., based on user input). In some embodiments, the first device receives a plurality of characters to the input field. In some embodiments, the one or more characters can comprise a password (e.g., an alphanumeric password, a personal identification number (PIN), etc.), a name (e.g., a sign-in name, etc.), and/or personal information (e.g., a social security number, etc.).

In operation 308, the first device can transmit the character input data to the second device (e.g., using PAN 150 of FIG. 1). The character input data can be associated with a character code. Character encoding systems include, but are not limited to, American Standard Code for Information Interchange (ASCII), Unicode, and International Organization for Standardization (ISO) coded character sets.

In operation 310, the second device can map the character input data to a corresponding haptic pattern. The haptic pattern can comprise a plurality of tactile pulses. The plurality of tactile pulses can comprise at least a first pulse lasting a first time and at least a second pulse lasting a second time. In some embodiments, the haptic pattern can comprise the plurality of tactile pulses representing the character using Morse code.

In operation 312, the second device can transmit the haptic instruction to a haptic motor (e.g., haptic motor 124 in FIG. 1) in the second device.

In operation 314, the haptic motor can vibrate according to the haptic pattern in the haptic instruction. In some embodiments, the haptic pattern can correspond to the one or more characters received in operation 306.

FIG. 3 is intended to represent the major operations of an example method for providing haptic feedback using multiple components in a networked components system, according to embodiments of the present disclosure. In some embodiments, however, individual operations can have greater or lesser complexity than shown in FIG. 3, and operations other than, or in addition to, those shown in FIG. 3 can be present. Furthermore, in some embodiments, various operations illustrated in FIG. 3 can have greater, lesser, or different functionality than shown in FIG. 3.

Figure 4:
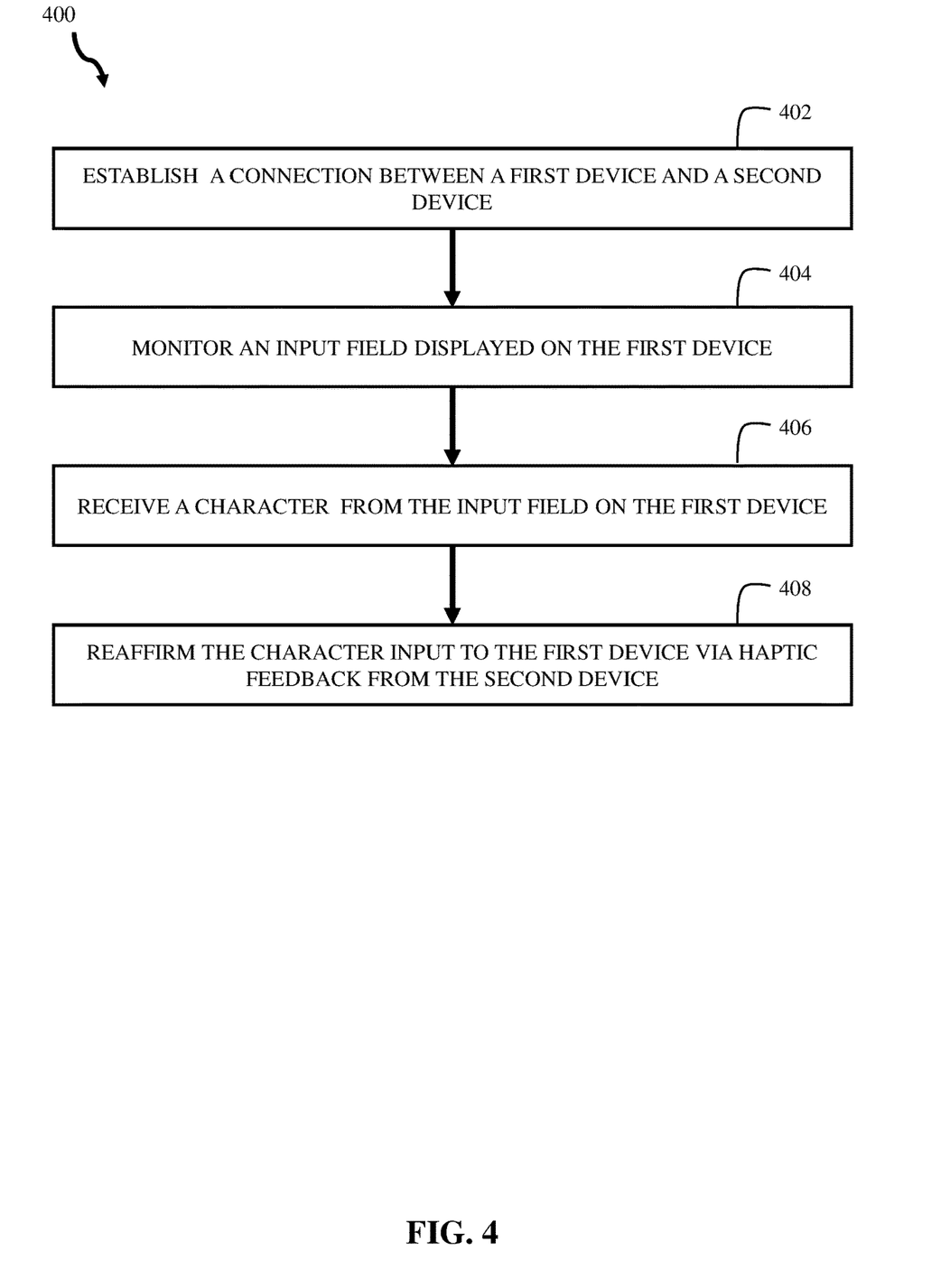
FIG. 4 illustrates a flowchart of an example method for utilizing haptic feedback with a component in a networked components system, in accordance with some embodiments of the present disclosure.

Referring now to FIG. 4, illustrated is a flowchart of an example method 400 for utilizing haptic feedback with a component in a networked components system, in accordance with some embodiments of the present disclosure. The method 400 can be performed by, for example, one or more components in a networked components system (e.g. networked components system 100 of FIG. 1) or an auxiliary communication system (e.g., auxiliary communication system 500 of FIG. 5). In other embodiments, the method 400 can be performed by alternative configurations of hardware and/or software.

In operation 402, a connection can be established between a first device (e.g. first device 110 in FIG. 1) and a second device (e.g. second device 120 in FIG. 1). The connection can be but is not limited to a PAN, WLAN, LAN, the internet, or a hard-wired connection.

In operation 404, an input field can be monitored on the first device. In some embodiments, the input field can be password field on a portion of a website.

In operation 406, a character can be entered into the input field on the first device. In some embodiments the character can comprise a plurality of characters.

In operation 408, the character input to the first device can be reaffirmed via haptic feedback from the second device. The haptic feedback can comprise a plurality of tactile pulses. The plurality of tactile pulses can comprise at least first pulse lasting a first time and at least second pulse lasting a second time. In some embodiments the second device can comprise a mobile phone with a haptic motor. The haptic motor can be, but is not limited to, an eccentric rotating mass actuator (ERM), a linear resonant actuator (LRA), and/or a piezoelectric actuator. In some embodiments, the haptic feedback can comprise tactile feedback, visual feedback, aural feedback, or a different form of feedback. In some embodiments, any ancillary noise generated as a result of outputting the feedback using the haptic motor can be cancelled by an acoustic signal generated by the second device.

FIG. 4 is intended to represent the major operations of an example method for utilizing haptic feedback with a component in a networked components system, according to embodiments of the present disclosure. In some embodiments, however, individual operations can have greater or lesser complexity than shown in FIG. 4, and operations other than, or in addition to, those shown in FIG. 4 can be present. Furthermore, in some embodiments, various operations illustrated in FIG. 4 can have greater, lesser, or different functionality than shown in FIG. 4.

Figure 5:
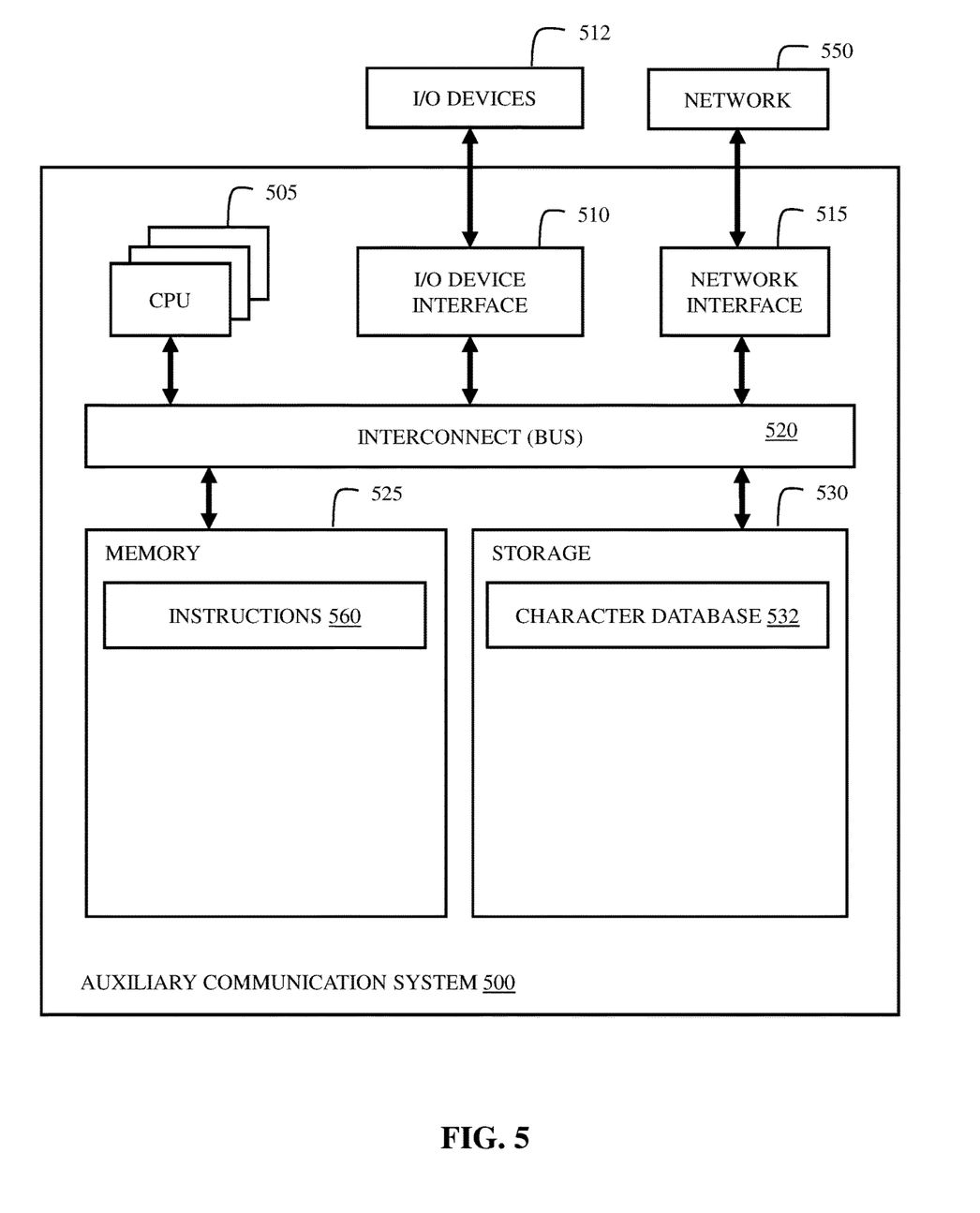
FIG. 5 illustrates a block diagram of an example auxiliary communication system, in accordance with some embodiments of the present disclosure.

FIG. 5 illustrates a block diagram of an example auxiliary communication system 500 in accordance with some embodiments of the present disclosure. In various embodiments, auxiliary communication system 500 performs any of the methods described in FIGS. 2-4. In some embodiments, auxiliary communication system 500 provides instructions for one or more of the methods described in FIGS. 2-4 to a client machine (e.g., first device 110 and/or second device 120 of FIG. 1) such that the client machine executes the method, or a portion of the method, based on the instructions provided by the auxiliary communication system 500.

The auxiliary communication system 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs)

(e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, or flash memory devices. In an alternative embodiment, the storage 530 can be replaced by storage area-network (SAN) devices, the cloud, or other devices connected to the auxiliary communication system 500 via the I/O device interface 510 or a network 550 via the network interface 515.

In some embodiments, the memory 525 stores instructions 560 and the storage 530 stores character database 532. However, in various embodiments, the instructions 560 and the character database 532 are stored partially in memory 525 and partially in storage 530, or they are stored entirely in memory 525 or entirely in storage 530, or they are accessed over a network 550 via the network interface 515.

The character database 532 can be consistent with character database 122 of FIG. 1. The character database 532 can comprise associations between two or more of character codes (e.g., American Standard Code for Information Interchange (ASCII) character codes, Unicode character codes, and/or International Organization for Standardization (ISO) character codes), haptic instructions, acoustic instructions, and/or light instructions.

The instructions 560 are processor executable instructions for executing any portion of, any combination of, or all of the methods previously discussed in FIGS. 2-4.

In various embodiments, the I/O devices 512 include an interface capable of presenting information and receiving input. For example, I/O devices 512 can present information to a user interacting with auxiliary communication system 500 and receive input from the user. In some embodiments, I/O devices 512 further comprise a physical keyboard.

Auxiliary communication system 500 is connected to the network 550 via the network interface 515. Network 550 can comprise a physical, wireless, cellular, or different network.

FIG. 5 is intended to represent the major components of an example auxiliary communication system 500 according to embodiments of the present disclosure. In some embodiments, however, individual components can have greater or lesser complexity than shown in FIG. 5, and components other than, or in addition to, those shown in FIG. 5 can be present. Furthermore, in some embodiments, various components illustrated in FIG. 5 can have greater, lesser, or different functionality than shown in FIG. 5.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any subset of the methods described with respect to FIGS. 2-4) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method comprising:
inputting a character from a physical keyboard to a computer displaying a website presenting a password field, wherein the character is displayed in the password field as a masked character;
receiving, at a mobile device and from the computer, a character code corresponding to the character that is input to the computer and from the physical keyboard, wherein the character code corresponds to a portion of a password that is displayed as the masked character by the computer communicatively coupled to the physical keyboard;
matching the character code to a haptic instruction stored in a character database on the mobile device, wherein the haptic instruction comprises a plurality of tactile pulses, wherein the plurality of tactile pulses comprise pulses having a first length and a second length, wherein the second length is approximately three times the first length;
actuating a haptic motor comprising a piezoelectric actuator in the mobile device to cause vibration according to the haptic instruction;
activating a light emitting diode (LED) in the mobile device to cause light pulses in a same pattern as the plurality of tactile pulses; and
producing a first acoustic signal from a speaker in the mobile device contemporaneously with a second acoustic signal generated by actuating the haptic motor, wherein the second acoustic signal is masked by the first acoustic signal, wherein the first acoustic signal comprises a first amplitude and a first phase, wherein the first amplitude is equal to a second amplitude of the second acoustic signal, and wherein the first phase is inverse to a second phase of the second acoustic signal.

2. The method of dam 1, wherein the mobile device comprises a mobile phone.

3. The method of claim 1, wherein the mobile device is communicatively coupled to the computer via a personal area network (PAN).

4. The method of claim 1, wherein the character code is an American Standard Code for Information Interchange (ASCII) character code.

5. The method of claim 1, wherein the character code is a Unicode character code.

6. The method of claim 1, wherein the character code is an International Organization for Standardization (ISO) character code.

7. A system comprising: a processor; and a computer-readable storage medium storing program instructions which, when executed by the processor, are configured to cause the processor to perform a method comprising:
- inputting a character from a physical keyboard to a computer displaying a website presenting a password field, wherein the character is displayed in the password field as a masked character;
- receiving, at a mobile device and from the computer, a character code corresponding to the character that is input to the computer and from the physical keyboard, wherein the character code corresponds to a portion of a password that is displayed as the masked character by the computer communicatively coupled to the physical keyboard;
- matching the character code to a haptic instruction stored in a character database on the mobile device, wherein the haptic instruction comprises a plurality of tactile pulses, wherein the plurality of tactile pulses comprise pulses having a first length and a second length, wherein the second length is approximately three times the first length;
- actuating a haptic motor comprising a piezoelectric actuator in the mobile device to cause vibration according to the haptic instruction;
- activating a light emitting diode (LED) in the mobile device to cause light pulses in a same pattern as the plurality of tactile pulses; and
- producing a first acoustic signal from a speaker in the mobile device contemporaneously with a second acoustic signal generated by actuating the haptic motor, wherein the second acoustic signal is masked by the first acoustic signal, wherein the first acoustic signal comprises a first amplitude and a first phase, wherein the first amplitude is equal to a second amplitude of the second acoustic signal, and wherein the first phase is inverse to a second phase of the second acoustic signal.

8. The system of claim 7, wherein the mobile device comprises a mobile phone.

9. The system of claim 7, wherein the mobile device is communicatively coupled to the computer via a personal area network (PAN).

10. The system of claim 7, wherein the character code is an American Standard Code for Information Interchange (ASCII) character code.

11. The system of claim 7, wherein the character code is a Unicode character code.

12. The system of claim 7, wherein the character code is an International Organization for Standardization (ISO) character code.

13. A computer program product comprising one or more computer readable storage media having program instructions collectively embodied therewith, the program instructions executable by one or more processors to cause the one or more processors to perform a method comprising;
- inputting a character from a physical keyboard to a computer displaying a website presenting a password field, wherein the character is displayed in the password field as a masked character;
- receiving, at a mobile device and from the computer, a character code corresponding to the character that is input to the computer and from the physical keyboard, wherein the character code corresponds to a portion of a password that is displayed as the masked character by the computer communicatively coupled to the physical keyboard;
- matching the character code to a haptic instruction stored in a character database on the mobile device, wherein the haptic instruction comprises a plurality of tactile pulses, wherein the plurality of tactile pulses comprise pulses having a first length and a second length, wherein the second length is approximately three times the first length;
- actuating a haptic motor comprising a piezoelectric actuator in the mobile device to cause vibration according to the haptic instruction;
- activating a light emitting diode (LED) in the mobile device to cause light pulses in a same pattern as the plurality of tactile pulses; and
- producing a first acoustic signal from a speaker in the mobile device contemporaneously with a second acoustic signal generated by actuating the haptic motor, wherein the second acoustic signal is masked by the first acoustic signal, wherein the first acoustic signal comprises a first amplitude and a first phase, wherein the first amplitude is equal to a second amplitude of the second acoustic signal, and wherein the first phase is inverse to a second phase of the second acoustic signal.

14. The computer program product of claim 13, wherein the mobile device comprises a mobile phone.

15. The computer program product of claim 13, wherein the mobile device is communicatively coupled to the computer via a personal area network (PAN).

16. The computer program product of claim 13, wherein the character code is an American Standard Code for Information Interchange (ASCII) character code.

17. The computer program product of claim 13, wherein the character code is a Unicode character code.

18. The computer program product of claim 15, wherein the character code is an International Organization for Standardization (ISO) character code.

* * * * *